2,795,618

ORGANIC PEROXIDES

William S. Emerson and Bernard S. Wildi, Dayton, Ohio, assignors to Monsanto Chemical Company, St. Louis, Mo., a corporation of Delaware No Drawing. Application June 26, 1953, Serial No. 364,492

8 Claims. (Cl. 260—610)

This invention relates to organic peroxides and deals more particularly with new hydroxy derivatives of organic peroxides and to methods of preparing the same.

An object of the invention is the preparation of new and useful peroxidic compounds. Another object of the invention is the preparation of organic peroxides possessing increased stability. Still another object of the invention is to increase the stability of organic peroxides without sacrificing the activity thereof.

These and other objects hereinafter disclosed are provided by the following invention wherein there are prepared certain activated β-hydroxy peroxides having the formula

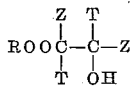

in which R is a hydrocarbon radical free of non-benzenoid unsaturation and containing from 1 to 18 carbon atoms, T is selected from the class consisting of hydrogen and methyl, and wherein one and only one Z is T and the other Z is selected from the class consisting of hydrogen, alkenyl radicals of from 2 to 4 carbon atoms, alkenyloxymethyl radicals of from 3 to 6 carbon atoms and haloalkyl radicals of from 1 to 4 carbon atoms.

Compounds having the above formula are obtained by the addition reaction of an organic hydroperoxide ROOH wherein R is as above defined with an epoxide of the formula

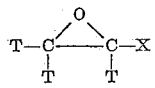

in which X is an activated radical selected from the class consisting of alkenyl radicals of from 2 to 4 carbon atoms, alkenyloxymethyl radicals of from 3 to 6 carbon atoms, and haloalkyl radicals of from 1 to 4 carbon atoms and T is selected from the class consisting of hydrogen and methyl. Depending upon the carbon atom at which the epoxide opens in the addition reaction there are obtainable two isomeric classes of β-hydroxy peroxides having the above formula. One class of isomers may be represented by the more restricted formula

ROOCT₂.CT(OH)X and the other class of isomers by the formula

ROOCTX.CTOH in which R, X and T are as defined above.

Hydroperoxides useful for the preparation of the present activated peroxides are hydroperoxides, generally, of hydrocarbons having from 1 to 18 carbon atoms and free from non-benzenoid unsaturation. Such hydroperoxides include, e. g., the paraffin hydroperoxides such as methyl, isopropyl, tert-butyl, triethylmethyl, 1-methylhexyl, n-octyl, or 2,7-dimethyloctyl hydroperoxide; the aralkyl hydroperoxides such as ethylbenzene, xylene, cymene, cumene, sec-butylbenzene, or diphenylmethane hydroperoxide; the hydroaryl hydroperoxides such as Tetralin, octalin, Decalin or indanyl hydroperoxide, cycloaliphatic hydroperoxides such as 1-methylcyclopentyl or 1-ethylcyclohexyl hydroperoxide, etc. Such useful hydroperoxides are generally known compounds, many of them being described by R. Criegee in his review on organic peroxides which appears in Fortschritte der chemischen Forschung 1: 508–566 (1950).

As stated above, the presently useful alkylene oxides have certain activating radicals as substituents at one of the carbon atoms of the oxirane ring. Such activated radicals may be certain alkenyl radicals, certain alkenyl oxymethyl radicals or certain haloalkyl radicals. As examples of alkylene oxides having the required activating substituents and useful for the present purpose may be mentioned the alkenyl-substituted oxiranes, i. e., the monoxides of dienic hydrocarbons such as 3,4-epoxybutene-1 (butadiene monoxide), 5,6-epoxyhexene-1, 3,4-epoxy-2-methylbutene-1, 4,5-epoxypentene-1, 3,4-epoxy-4-methylpentene-1, etc. The presently useful alkyleneoxiranes, i. e., those in which the alkylene radical has from 2 to 4 carbon atoms are readily obtainable by oxidation of a dienic hydrocarbon of from 4 to 6 carbon atoms with a per-acid, substantially as described in the article by Swern appearing in Chemical Reviews 45: 1 (1949).

The presently useful alkenyloxymethyl-substituted oxiranes are alkenyl ethers of glycidol (2,3-epoxypropanol-1) in which the alkenyl radical has from 2 to 5 carbon atoms, e. g., vinyl glycidyl ether, allyl glycidyl ether, methallyl glycidyl ether, crotyl glycidyl ether, ethylallyl glycidyl ether, etc. The preparation of these compounds from an epihalohydrin and the suitable alcohol is described in the Evans and Shokal U. S. Patent 2,314,039.

The presently useful haloalkyl-substituted oxiranes are generally obtainable by dehydration of dihalohydrins, e. g., as described in the Engs and Fairbairn U. S. Patent 2,177,419. Examples of haloalkyloxiranes which may be used for the preparation of the present activated β-hydroxy peroxides are epichlorohydrin, (α-chloromethyloxirane), epifluorohydrin, epibromohydrin, epiiodohydrin, α,β-dibromoethyloxirane, α-chloroethyloxirane, 2-chloromethyl-2-methyloxirane, 2-chloromethyl-3-methyloxirane, 2-(trichloromethyl)oxirane, 2-bromomethyl-3-methyloxirane, β-bromoethyloxirane, γ-chloropropyloxirane, 2-α-chloroethyl-3-methyloxirane, etc.

Reaction of the hydroperoxides with the alkylene oxides to yield the present β-hydroxyalkyl peroxides occurs by simply contacting the two reactants in the presence or absence of a basically reacting catalyst and allowing the resulting reaction mixture to stand at ordinary or moderately elevated temperatures until formation of the peroxides has taken place. Generally the use of temperatures of up to say, 80° C., is preferred. While the reaction occurs in the absence of a catalyst, better yields are obtained when operating in the presence of catalytic quantities of organic or inorganic basic materials. Basic catalysts which may be employed include, for example, alkali or alkaline earth metal hydroxides or basically reacting salts thereof such as sodium, potassium, lithium, calcium or magnesium hydroxide, sodium, potassium or magnesium carbonate, calcium, lithium or sodium acetate, etc., organic bases such as pyridine, choline, quinoline, ethanolamine, triisopropanolamine, trimethylbenzylammonium hydroxide, etc.

As stated above, the reaction product obtained from the mixture of organic hydroperoxide and alkylene oxide, and if desired, basic catalyst, is generally a mixture of isomeric β-hydroxyalkyl peroxides, together with any unreacted initial materials. After separating the unreacted material, e. g., by frictional distillation or solvent extraction, the remainder of the product usually consists of a mixture of the isomers.

Since reaction to form either isomer takes place by addition of one mole of the alkylene oxide to one mole of the hydroperoxide, equimolar quantities of the reactants are advantageously employed. However, inasmuch as any excess of either the hydroperoxide or the alkylene oxide may be readily recovered from the final product, the proportion of each initial reactant is immaterial. Generally, in order to assure complete reaction of the less easily available hydroperoxide, an excess of the alkylene oxide is used.

The formation of both isomers in the addition reaction is probably due to the opening of the alkylene oxide ring at either carbon atom. The quantity of each isomer present in the reaction product varies with the individual alkylene oxide used as well as with the reaction conditions employed. The mixture of isomers which is generally obtained may be resolved by repeated distillations or extractions. In most instances, however, the isolation steps may be dispensed with, and the isomeric mixtures employed as such for a wide variety of industrial purposes. The usefulness of the present peroxides depends to a great extent on the presence of the activating radical and of the hydroxy radical in the β-position, and since both isomers are characterized by this feature, there is generally little practical need for separating the two.

The present β-hydroxyalkyl peroxides range from clear, viscous liquids to waxy or crystalline solids. While organic peroxides are generally regarded as highly unstable materials, the present peroxides have a higher degree of stability than prior related compounds, for example, the α-hydroxyalkyl peroxides obtained by reaction of organic hydroperoxides with aldehydes or ketones. They are much less readily hydrolyzed under the conditions employed for the preparation of arcrylonitrile polymers than are the α-hydroxyalkyl peroxides. Although not easily hydrolyzed, the presence of the activating alkenyl, alkenyloxymethyl or haloalkyl groups in the present β-hydroxy peroxides adds greatly to their efficiency, particularly as polymerizing catalysts. The present compounds are particularly efficient polymerizing agents for acrylonitrile and mixtures of acrylonitrile with monomeric materials copolymerizable therewith, yielding acrylonitrile polymers which possess superior heat-stability properties. The present β-hydroxyalkyl compounds are also very advantageously employed as bleaching agents and as deodorants and in other applications where resistance to hydrolysis coupled with high activity makes them especially valuable.

The invention is further illustrated, but not limited, by the following examples:

Example 1

A mixture consisting of 20 g. of epichlorohydrin, 33 g. of tert-butyl hydroperoxide (60% assay) and 1 ml. of 25% aqueous sodium hydroxide was stirred for 25 hours at a temperature of 65° C. The reaction mixture was then washed with water and diluted with an equal volume of ether. The ether solution was then extracted with 100 ml. of 15% aqueous sodium hydroxide and washed with an equal volume of water. After drying over sodium sulfate, it was distilled to yield a fraction, B. P. 89–93° C./1.3 mm., and consisting of a mixture of tert-butyl 2-hydroxy-3-chloropropyl peroxide and tert-butyl 1-chloromethyl-2-hydroxyethyl peroxide, which mixture analyzed as follows:

|  | Found | Calcd. for $C_7H_{15}O_3Cl$ |
|---|---|---|
| Percent C | 46.40 | 46.04 |
| Percent H | 7.97 | 8.28 |

Example 2

A mixture consisting of 140 g. of butadiene monoxide, 180 g. of commercial tert-butyl hydroperoxide and 11 ml. of Triton B (trimethylbenzylammonium hydroxide) was stirred at a temperature of 27° C. for one day and then at 40–45° C. for an additional 24 hours. Distillation of the resulting reaction mixture under partial vacuum gave a fraction, B. P. 40–78° C./14 mm., which upon redistillation yielded a mixture of tert-butyl 1-vinyl-2-hydroxyethyl peroxide and 2-hydroxy-3-butenyl peroxide, B. P. 67–75° C./14 mm., which mixture analyzed as follows:

|  | Found | Calcd. for $C_8H_{16}O_3$ |
|---|---|---|
| Percent C | 59.92 | 59.97 |
| Percent H | 10.67 | 10.06 |

Example 3

30 g. of glycidyl allyl ether were added, over a period of 30 minutes, to a mixture consisting of 125 g. of commercial tert-butyl hydroperoxide and 5 g. of Triton B (trimethylbenzylammonium hydroxide) at a temperature of 40° C. The whole was then heated with stirring, at 60° C. for 24 hours. Distillation of the resulting reaction mixture under partial vacuum gave a fraction, B. P. 99–103° C./2.3 mm., which upon redistillation yielded a mixture consisting of the isomeric tert-butyl 1-allyloxymethyl-2-hydroxyethyl peroxide and tert-butyl 3-allyloxy-2-hydroxypropyl peroxide, B. P. 79–81° C./1.3 mm., $N_D^{25}$ 1.4437, which mixture analyzed as follows:

|  | Found | Calcd. for $C_8H_{18}O_4$ |
|---|---|---|
| Percent C | 57.73 | 56.82 |
| Percent H | 9.57 | 9.53 |

Example 4

60 g. of a 1% aqueous solution of the mixture of isomeric β-hydroxyalkyl peroxides of Example 2 and 200 g. of a mixture of acrylonitrile and vinyl acetate (97:3 weight ratio) containing about 0.8 g. of sulfur dioxide were separately dropped into 680 g. of water, emulsified with a polyoxyethylene thioether type of surface active agent and maintained at a temperature of about 80° C. The whole was then allowed to stand for an hour at this temperature. The resulting copolymer was then separated and dried. Heat stability tests of the dried copolymer showed substantially no discoloration of the product when held for long periods of time at a temperature of 185° C., whereas similar copolymers prepared in the presence of other peroxidic agents, e. g., potassium persulfate or tert-butyl hydroperoxide as catalyst are not color-stable at such temperature conditions.

While the present β-hydroxyalkyl peroxides are very advantageously employed as polymerizing catalysts for acrylonitrile, they are also useful in the formulation of explosives and rocket propellants, as bleaching agents for cereal flours and cellulosic fibers, as household deodorants, as chemical intermediates, etc.

This application is a continuation-in-part of our copending application, Serial No. 223,154, filed April 26, 1951, and now abandoned.

What we claim is:

1. A peroxidic composition selected from the class consisting of (I) a mixture of isomeric peroxides consisting of tert-butyl 2-hydroxy-3-chloropropyl peroxide and tert-butyl 1-chloromethyl-2-hydroxyethyl peroxide, (II) a mixture of isomeric peroxides consisting of tert-butyl 1-vinyl-2-hydroxyethyl peroxide and 2-hydroxy-3-butenyl peroxide, and (III) a mixture of isomeric peroxides consisting of tert-butyl 1-allyloxymethyl-2-hydroxyethyl peroxide and tert-butyl 3-allyloxy-2-hydroxypropyl peroxide.

2. A mixture of isomeric peroxides consisting of tert-butyl 2-hydroxy-3-chloropropyl peroxide and tert-butyl 1-chloromethyl-2-hydroxyethyl peroxide.

3. A mixture of isomeric peroxides consisting of tert-butyl 1-vinyl-2-hydroxyethyl peroxide and 2-hydroxy-3-butenyl peroxide.

4. A mixture of isomeric peroxides consisting of tert-butyl 1-allyloxymethyl-2-hydroxyethyl peroxide and tert-butyl 3-allyloxy-2-hydroxypropyl peroxide.

5. The process of preparing a peroxidic composition which comprises contacting tert-butyl hydroperoxide with an epoxy compound selected from the class consisting of epichlorohydrin, butadiene monoxide and glycidyl allyl ether.

6. The method which comprises contacting epichlorohydrin with tert-butyl hydroperoxide and recovering from the resulting reaction product an isomeric mixture of peroxides consisting of tert-butyl 2-hydroxy-3-chloropropyl peroxide and tert-butyl 1-chloromethyl-2-hydroxyethyl peroxide.

7. The method which comprises contacting butadiene monoxide with tert-butyl hydroperoxide and recovering from the resulting reaction product an isomeric mixture of peroxides consisting of tert-butyl 1-vinyl-2-hydroxyethyl peroxide and 2-hydroxy-3-butenyl peroxide.

8. The method which comprises contacting glycidyl allyl ether with tert-butyl hydroperoxide and recovering from the resulting reaction product an isomeric mixture of peroxides consisting of tert-butyl 1-allyloxymethyl-2-hydroxyethyl peroxide and tert-butyl 3-allyloxy-2-hydroxypropyl peroxide.

References Cited in the file of this patent
UNITED STATES PATENTS

| | | |
|---|---|---|
| 2,425,191 | Kropa | Aug. 5, 1947 |
| 2,436,926 | Jacobson | Mar. 2, 1948 |
| 2,455,569 | Dickey | Dec. 7, 1948 |
| 2,605,291 | Barusch et al. | July 29, 1952 |